Patented May 25, 1954

2,679,521

UNITED STATES PATENT OFFICE 2,679,521

OXYPROPYLATED ESTERS OF POLYCARBOXYLIC ACIDS

Melvin De Groote, St. Louis, Mo., assignor to Petrolite Corporation, a corporation of Delaware No Drawing. Original application September 5, 1950, Serial No. 183,293. Divided and this application January 9, 1952, Serial No. 265,710

9 Claims. (Cl. 260—475)

The present invention is concerned with certain new chemical products, compounds or compositions which have useful application in various arts.

The particular compounds subsequently described herein in greater detail are hydrophile synthetic products, and more particularly, fractional esters obtained from polycarboxy acids and diols obtained by the oxypropylation of a monohydric glycerol diether and reaction of such oxypropylated monohydric glycerol diether with glycide to form the diols as dihydroxylated ethers of glycerol with the proviso that each ether radical of the original glycerol diether have less than 8 carbon atoms and is obtained from a water-soluble alipahtic alcohol or from a phenol such as hydroxybenzene or cresol. Diglycerol ethers which have two ether linkages and also two hydroxyl radicals and a lengthy repetitious polypropylene oxide radical in the form of a polyether are suitable for the synthesis which yields the herein described products. Such ethers can be obtained by various procedures. The simplest procedure is to obtain diethers of glycerol and react such diether with a plurality of moles of propylene oxide and subsequently convert such monohydric compound into a diol by means of glycide. A number of diethers of glycerol, such as glycerol alpha-gamma diisopropyl ether, glycerol alpha-gamma diphenyl ether, etc., are available in the open market. These products are prepared readily by reacting epichlorohydrin with the selected alcohol so as to yield an ether of epichlorohydrin. Such ether can then be reacted with alkali so as to give a glycidyl ether. Such glycidyl ether can be reacted further with a second mole of alcohol, either the same alcohol or a different alcohol, so as to yield a diether of glycerol. As to a complete description of such reaction see pamphlet entitled "Epichlorohydrin," Shell Chemical Corporation, 500 Fifth Avenue, New York city, N. Y.

More specifically then the glycerol diethers are obtained from hydroxylated compounds such as an alcohol, phenol, a phenoxyalkanol or the like, free from any radical having 8 or more carbon atoms. Such monohydric glycerol diether is reacted with propylene oxide so as to obtain a high molal alcohol ether or glycerol diether. The monohydric compound so obtained is reacted with glycide so as to get a diol in which both hydroxyls are attached to two of the three terminal carbon atoms at one end of the molecule, and at the other end of the molecule there is a branched structure due to the fact that a diether of glycerol was the initial starting material. All of this will be described more fully subsequently.

Reference is made to the fact that the initial monohydric reactant used to produce the diether of glycerol must have less than 8 carbon atoms. This means that the oxypropylated monohydric compound must be free from any radical having 8 carbon atoms or more. Such compound is in essence a high molal ether alcohol. The expression "high molal" is employed to indicate a product having a molecular weight from 1,000 to several thousands, preferably within the range of 1,500 to 4,00 or even a more narrow range as stated subsequently. Suitable monohydric materials include the usual aliphatic alcohols, such as methyl alcohol, ethyl alcohol, propyl alcohol, butyl alcohol, allyl alcohol, hexyl alcohol, etc. Also there are included the phenols such as hydroxybenzene and cresol. My preference is to use aliphatic alcohols having at least 3 carbon atoms and preferably being water-soluble. This includes propyl alcohol, butyl alcohol, or amyl alcohol. In the case of butyl and amyl alcohols some of the isomers are water-soluble to the extent that they show solubility to the extent of a few percent at room temperature.

The oxypropylation, or for that matter the treatment of such monohydric compounds with any alkylene oxide and particularly ethylene oxide and propylene oxide, is well known. It is preferably conducted in the presence of an alkaline catalyst and a residual catalyst is preferably permitted to remain in the mass at the end of the reaction in order to catalyze subsequent treatment with glycide.

Briefly stated then a monohydric alcohol or other monohydric reactant having less than 8 carbon atoms in any single radical may be indicated thus: R'OH. Such reactant can be employed to produce a diether of glycerol which, for convenience, can be indicated thus:

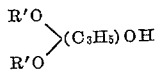

Reacting such monohydric alcohol, or more correctly monohydric ether alcohol, with propylene oxide the resultant ether alcohol may be indicated thus:

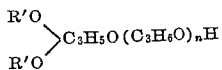

It has been pointed out previously that such monohydric ether alcohols must be of fairly high molecular weight and thus the value of $n$ in the preceding formula is within the range of approximately 15 to 80. My preference is that the molecular weight of the compound at this stage, i. e., prior to treatment with glycide, be within the range of 2,000 to 3,000. Purely as a matter of convenience the preceding formula can be rewritten thus:

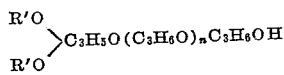

without changing $n$ to $n-1$.

It is immaterial as to the method of obtaining the diethers of glycerol and as to the method of oxypropylating such compounds. Oxypropylation is conventionally conducted in presence of an alkaline catalyst such as caustic soda, sodium methylate, etc.

Having obtained such high molal oxypropylated derivative it is then treated with glycide or otherwise reacted so as to produce a diol which also may be referred to for convenience as an etherized glycerol. This may be shown in the following reaction:

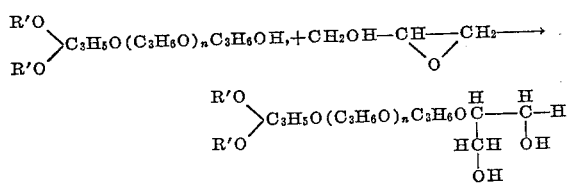

In examining the above reaction it is obvious that an isomeric mixture is obtained for reasons which are obvious in light of what is said subsequently concerning oxyethylation or oxypropylation when there is a multiplicity of recurring alkylene oxide units. Furthermore, propylene oxide being an unsymmetrical alpha-beta oxide it may have ring rupture so as to involve, at least theoretically, two different isomeric derivatives. This is true, also, in regard to glycide, i. e., at least theoretically as the two terminal hydroxyls, instead of being attached to the two carbon atoms shown, might be attached to the first and second carbon atoms and not to the third, or more correctly the branched chain carbon atom.

From what is said hereinafter it is immaterial as to which particular isomer is obtained, or if a mixture is obtained. In any event, having obtained such glycol ether or diol, or etherized glycerol, such product is then reacted with a polycarboxy acid or anhydride in the ratio of two moles of acid or anhydride for each mole or diol.

Briefly then, the present invention is concerned with hydrophile synthetic products; said hydrophile synthetic products being characterized by the following formula:

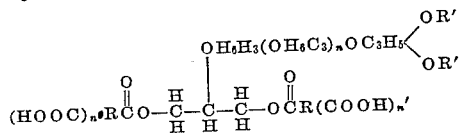

in which $n$ is a whole number varying from 15 to 80; $n'$ is a whole number not over 2; $R'$ is a hydrocarbon radical having less than 8 carbon atoms, and R is the radical of the polycarboxy acid

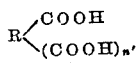

in which $n'$ has its previous significance; with the further proviso that the parent diol prior to esterification be water-insoluble and kerosene-soluble, and furthermore that in said diol two of the three hydroxyl radicals be attached to two of the three adjacent carbon atoms of a terminal group opposite to the terminal group

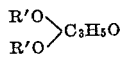

The products of this invention are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This use of the particular products described herein is described and claimed in my copending application Serial No. 183,293, filed September 5, 1950.

The products are also useful for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts from pipeline oil.

For convenience, what is said hereinafter may be divided into five parts:

Part 1 will be concerned with the oxypropylation derivatives of the monohydric compounds;

Part 2 will be concerned with the preparation of the diols by reacting the above-mentioned oxypropylated monohydric compounds with glycide or by other suitable means;

Part 3 is concerned with the preparation of esters from the aforementioned diols;

Part 4 is concerned with the structure of the peculiar herein described diols and their significance in light of what is said subsequently; and Part 5 is concerned with certain derivatives which can be obtained from the diols of the type aforementioned.

In some instances such derivatives are obtained by modest oxyethylation preceding the oxypropylation step, or oxypropylation followed by oxyethylation. Similarly, modest oxypropylation could follow treatment with glycide. This results in diols having somewhat different properties which can then be reacted with the same polycarboxy acids or anhydrides described in Part 3.

PART 1

Previous reference has been made to the use of certain monohydric compounds as initial raw materials. Such compounds include glycerol alpha-gamma dimethyl ether, glycerol alpha-gamma diethyl ether, glycerol alpha-gamma diisopropyl ether, glycerol alpha-gamma dibutyl ether, glycerol alpha-gamma diphenyl ether, etc. As a matter of convenience, the invention will be illustrated by means of the two raw materials most readily available, i. e., glycerol alpha-gamma diisopropyl ether and glycerol alpha-gamma diphenyl ether.

Example 1a

The monohydric compound employed was glycerol alpha-gamma diisopropyl ether. The product was substantially anhydrous. In the initial oxypropylation this material was reacted with propylene oxide in the ratio of 20 moles of propylene oxide for each mole of the monohydric ether alcohol. The autoclave employed was one having a capacity of about 5 gallons, or approximately 40 pounds of reaction mass. The speed of the stirrer could be varied from 150 to 350 R. P. M. 3.52 pounds of glycerol alpha-gamma diisopropyl ether was charged into the autoclave along with 7 ounces of sodium hydroxide. The reaction pot was flushed out with nitrogen. The autoclave was sealed and the automatic devices set for injecting 23.2 pounds of propylene oxide in 3 hours, with an allowance of another hour for stirring to insure completeness of reaction. The pressure regulator was set for a maximum of 35 pounds per square inch. This meant that the bulk of the reaction could take place, and probably did take place, at a comparatively lower pressure. This comparatively low pressure was the result of the fact that considerable catalyst was present. The propylene oxide was added at the rate of about 8 pounds per hour. More important, the selected temperature range was 205° to 215° F. (about the boiling point of water). The initial introduction of propylene oxide was not started until the heating devices had raised the temperature to about the boiling point of water. At the completion of the reaction the molecular weight, based on hydroxyl determination, was 820 compared with a theoretical molecular weight of 1336.

The final product was fairly water-soluble and fairly dispersible in xylene but not soluble in kerosene, or at least the bulk of the compound was not soluble in kerosene.

This batch of approximately 27 pounds was divided into five equal portions and subsequently subjected to further oxypropylation as described in Examples 2a to 6a, inclusive.

Example 2a

In this instance the same procedure was employed as in Example 1a, preceding, except that the initial reactant was 5.3 pounds of the oxypropylated derivative described as Example 1a, preceding. To this mixture there was added 3½ ounces of caustic soda. The time period was about 1¼ hours with an added 45 minutes for stirring. The amount of oxide added was 5.3 pounds. The molecular weight, based on hydroxyl value, was 1,075 compared with a theoretical molecular weight of 2,496.

The conditions of temperature and pressure were substantially the same as in Example 1a, preceding. The product was water-insoluble, xylene-soluble and kerosene-soluble. This statement applies also to the next four examples and will not be repeated.

Incidentally, the appearance of all these products varied from rather viscous, colorless or straw-colored compounds to others having an amber tint. Those of the highest molecular weight would hardly flow at ordinary temperature or at least were rather viscous. For convenience, I have stored samples in wide-mouth cans. This applies to all the various samples herein described and this statement will not be repeated.

Also, what is said in regard to color and viscosity applies to samples after treatment with glycide as described in Part 2.

Example 3a

The same procedure was followed as in Example 2a, preceding, i. e., the initial charge was 5.3 pounds of the product identified as Example 1a, preceding. The amount of propylene oxide added was 9.3 pounds. The amount of catalyst added was 5 ounces. The time period for the addition of propylene oxide was 1¾ hours with another hour for stirring to insure completeness of reaction. The final product showed a molecular weight, based on hydroxyl value, of 1,485 compared with theoretical molecular weight of 3,656.

The conditions of temperature and pressure were all the same as in the previous examples and, as a matter of fact, applied to all the subsequent examples in this series, i. e., Examples 4a through 6a, so this information will not be repeated.

Example 4a

The initial reactant was the same as in the two preceding examples, Examples 2a and 3a, i. e., 5.3 pounds of the product identified as Example 1a, preceding. The amount of propylene oxide added was 13.9 pounds. The amount of alkaline catalyst employed was 6 ounces. The time required to add the propylene oxide was 2 hours with an allowance of an hour more for stirring to insure completeness of reaction.

The molecular weight, based on hydroxyl number determination was 1,870 compared with theoretical molecular weight of 4,816.

Example 5a

The same procedure was followed as in Example 2a, 3a, and 4a, preceding. The initial reactant was 5.3 pounds of the material previously identified as Example 1a, preceding. The amount of propylene oxide added was 18.6 pounds. The amount of catalyst added was 7.5 ounces of caustic soda. The time period for the introduction of the oxide was 3 hours and the reaction mass was stirred for an hour longer to insure completeness of reaction.

The final product showed a molecular weight based on hydroxyl number of 2,230 compared with a theoretical molecular weight of 5,976.

*Example 6a*

The same procedure was followed as in Example 5a, preceding. The initial reactant as before 5.3 pounds of the product identified as Example 1a, preceding. The amount of propylene oxide added was 23.2 pounds. The amount of catalyst added was 10 ounces. Propylene oxide was added in a 4-hour period with 1½ hours additional for stirring to insure completeness of reaction. The molecular weight of the product based on hydroxyl value was 2,410 as compared with the theoretical molecular weight of 7,136.

The same procedure was employed in connection with glycerol alpha-gamma diphenyl ether. The characteristics of the product were much the same except that the tendency for water-solubility to decrease and for xylene-solubility and kerosene-solubility to increase in the earlier stages of oxypropylation were more pronounced. However, for practical effect the corresponding examples showed substantially the same solubility. Particular reference is made to Examples 7a through 12a in the following table, designated as Table 1. Table 1 includes data in regard to Examples 1a through 6a, as above described, and also diphenyl examples 7a through 12a.

In the following table all examples were conducted in the same molal ratio as the first series, the only difference being as follows: Initially in Example 7a, 4.9 pounds of glycerol alpha-gamma diphenyl ether was employed instead of 3.52 pounds of glycerol alpha-gamma diisopropyl ether. The initial reaction mass was broken into five parts of approximately 5.6 pounds each instead of 5.3 pounds each. The amount of oxide added, the time factor, temperature factor, pressure factor, etc., were substantially the same within ability to repeat the second series as in Examples 1a through 6a.

TABLE 1

| Example No. | Initial Monohydric Compound | Theoretical Weight | Molecular Weight Based on Hydroxyl Value |
|---|---|---|---|
| 1a | Glycerol alpha-gamma diisopropyl ether. | 1,336 | 820 |
| 2a | ------do------ | 2,496 | 1,075 |
| 3a | ------do------ | 3,656 | 1,485 |
| 4a | ------do------ | 4,816 | 1,870 |
| 5a | ------do------ | 5,976 | 2,230 |
| 6a | ------do------ | 7,136 | 2,410 |
| 7a | Glycerol alpha-gamma diphenyl ether. | 1,404 | 915 |
| 8a | ------do------ | 2,564 | 1,100 |
| 9a | ------do------ | 3,724 | 1,460 |
| 10a | ------do------ | 4,884 | 1,760 |
| 11a | ------do------ | 6,044 | 2,150 |
| 12a | ------do------ | 7,204 | 2,215 |

Although caustic soda was used in the above oxypropylation needless to say any other suitable catalyst, such as sodium methylate, caustic potash, or the like, could have been employed equally satisfactorily.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 1,000 to 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 3 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously stated, the oxypropylated monohydric compounds of comparatively high molecular weight (usually in excess of 1,000 based on hydroxyl value) are converted into diols by reaction with glycide mole for mole. Needless to say, other reactions can be employed which do not involve glycide, for example, one can produce ethers of the kind herein employed by use of a glycerol monochlorohydrin, i. e., either alpha or beta glycerol monochlorohydrin. Attention is directed again to the fact that in the previous formula and in the formulas in the claims it would be immaterial whether the free hydroxyl radicals prior to esterification are present as attached to the first and third terminal carbon atoms, or second and third carbon atoms. This is simply an isomeric difference depending on how the epoxy ring is ruptured in the case of glycide, or whether one employs glycerol alpha monochlorohydrin.

Other suitable procedure involves the use of epichlorohydrin in a conventional manner. For instance, the oxypropylated compound can be treated with epichlorohydrin and the resultant product treated with caustic soda so as to reform the epoxy ring. The epoxide so obtained can then be treated with water so as to yield a compound having two hydroxyl radicals attached to two of the three terminally adjacent carbon atoms.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,370, dated March 7, 1950, to De Groote and Keiser, and offered for sale by numerous laboratory supply houses. If such arrangement is used to prepare laboratory-scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of the mantle. If a stainless steel coil is introduced it means that the conventional stirrer of the paddle type is changed into the centrifugal type which causes the fluid or reactants to mix due to swirling action in the center of the pot. Still better, is the use of a laboratory autoclave of the kind previously described in Part 1; but in any event, when the initial amount of glycide is added to a suitable reactant, such as Examples 2a through 6a, preceding, the speed of reaction should be controlled by the usual factors, such as (a) the addition of glycide; (b) the elimination of external heat; and (c) the use of a cooling coil so there is no undue rise in temperature. All the foregoing is merely conventional but is included due to the hazard in handling glycide.

*Example 1b*

The equipment used was the glass resin pot of the kind described above. Into this pot were charged 165 grams of the product identified as Example 1a, preceding. To it there was added 1% sodium methylate. There was additional alkaline catalyst present due to the caustic used in the preceding oxypropylation. The temperature of the reaction mass was raised to about 120° C. 15 grams of glycide was added in a period of a little over an hour. Whenever the temperature tended to rise past 130° C. the reaction mass was cooled. If the temperature showed a tendency to drop below 112° to 115° C., the reaction mass was heated. When all the glycide had been added the reaction mass was stirred for approximately an hour longer at 130° C. and then heated to a temperature below the decomposition point of glycide, for instance, 140° C., and held at this temperature for another hour. In this particular reaction there is less hazard than is usually the case insofar that the amount of glycide added was comparatively small. Even so, such oxyalkylation should be conducted with extreme care.

These data and similar data are summarized in the following table.

TABLE 2

| Ex. No. of Diol | Ex. No. Monohydric Compound | Mol. Wt. of Monohydric Compound Based on Hydroxyl Value | Amt. of Monohydric Compound Used (grs.) | Glycide Amt. (grs.) | Mol. Wt. of Diol Obtained, Calculated from Column 3 |
|---|---|---|---|---|---|
| 1b | 1a | 820 | 205 | 18.5 | 894 |
| 2b | 2a | 1,075 | 215 | 15.0 | 1,149 |
| 3b | 3a | 1,485 | 248 | 12.5 | 1,559 |
| 4b | 4a | 1,870 | 311 | 12.5 | 1,944 |
| 5b | 5a | 2,230 | 320 | 10.5 | 2,304 |
| 6b | 6a | 2,410 | 301 | 9.0 | 2,484 |
| 7b | 7a | 915 | 228 | 18.5 | 989 |
| 8b | 8a | 1,100 | 224 | 15.0 | 1,174 |
| 9b | 9a | 1,460 | 243 | 12.5 | 1,534 |
| 10b | 10a | 1,760 | 290 | 12.5 | 1,834 |
| 11b | 11a | 2,150 | 307 | 10.5 | 2,224 |
| 12b | 12a | 2,215 | 316 | 9.0 | 2,289 |

PART 3

As previously pointed out the present invention is concerned with acidic esters obtained from the diols described in Part 2, preceding, said diols being in turn obtained from oxypropylated monohydric derivatives obtained as described in Part 1, preceding. Said esters, and more particularly acidic esters, are obtained from various polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over para-toluene sulfonic acid and that is that at the end of the reaction is can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 3.

The products obtained in Part 2 preceding may contain a basic catalyst. As a general procedure I have added an amount of half-concentrated hydrochloric acid considerably in excess of what is required to neutralize the residual catalyst.

The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene, decalin, petroleum solvent, or the like, so that one has obtained approximately a 46–65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 2, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a highboiling aromatic petroleum solvent. These solvents are sold by various oil refineries and, as far as solvent effect act as if they were almost completely aromatic in character. Typical distillation data in the particular type I have employed and found very satisfactory is the following:

| | |
|---|---|
| I.B.P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° C., or even to 200° C., if need be. My preference is not to go above about 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then a high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in all instances, is a mixture of 7 volumes of the aromatic petroleum solvent previously described and 3 volumes of benzene. This was used, or a similar mixture, in the manner previously described. In a large number of similar examples decalin has been used but it is my preference to use the above mentioned mixture and particularly with the preliminary step of removing all the water. If one does not intend to remove the solvent my preference is to use the petroleum solvent–benzene mixture although obviously any of the other mixtures, such as decalin and xylene, can be employed.

The data included in the subsequent tables, i. e., Tables 3 and 4, are self-explanatory, and very complete and it is believed no further elaboration is necessary.

TABLE 3

| Ex. No. of Acid Ester | Ex. No. of Hydroxy Compound | Mol. Wt. of Hydroxy Cmpd. by OH Determ. | Amount Hydroxy Compound Used (grs.) | Polycarboxy Reactant | Amt. Used (grs.) |
|---|---|---|---|---|---|
| 1c | 1b | 894 | 224 | Phthalic Anhydride | 74 |
| 2c | 1b | 894 | 224 | Maleic Anhydride | 49 |
| 3c | 1b | 894 | 224 | Citraconic Anhydride | 56 |
| 4c | 1b | 894 | 224 | Succinic Anhydride | 50 |
| 5c | 1b | 894 | 224 | Diglycollic Acid | 67 |
| 6c | 1b | 894 | 224 | Aconitic Acid | 87 |
| 7c | 2b | 1,149 | 230 | Phthalic Anhydride | 59 |
| 8c | 2b | 1,149 | 230 | Maleic Anhydride | 39 |
| 9c | 2b | 1,149 | 230 | Citraconic Anhydride | 45 |
| 10c | 2b | 1,149 | 230 | Succinic Anhydride | 40 |
| 11c | 2b | 1,149 | 230 | Diglycollic Acid | 54 |
| 12c | 2b | 1,149 | 230 | Aconitic Acid | 70 |
| 13c | 3b | 1,559 | 260 | Phthalic Anhydride | 49 |
| 14c | 3b | 1,559 | 260 | Maleic Anhydride | 33 |
| 15c | 3b | 1,559 | 260 | Citraconic Anhydride | 37 |
| 16c | 3b | 1,559 | 260 | Succinic Anhydride | 33 |
| 17c | 3b | 1,559 | 260 | Diglycollic Acid | 45 |
| 18c | 3b | 1,559 | 260 | Aconitic Acid | 58 |
| 19c | 4b | 1,944 | 278 | Phthalic Anhydride | 42 |
| 20c | 4b | 1,944 | 278 | Maleic Anhydride | 28 |
| 21c | 4b | 1,944 | 278 | Citraconic Anhydride | 32 |
| 22c | 4b | 1,944 | 278 | Succinic Anhydride | 29 |
| 23c | 4b | 1,944 | 278 | Diglycollic Acid | 38 |
| 24c | 4b | 1,944 | 278 | Aconitic Acid | 50 |
| 25c | 5b | 2,304 | 288 | Phthalic Anhydride | 37 |
| 26c | 5b | 2,304 | 188 | Maleic Anhydride | 25 |
| 27c | 5b | 2,304 | 288 | Citraconic Anhydride | 28 |
| 28c | 5b | 2,304 | 288 | Succinic Anhydride | 25 |
| 29c | 5b | 2,304 | 288 | Diglycollic Acid | 35 |
| 30c | 5b | 2,304 | 288 | Aconitic Acid | 41 |
| 31c | 6b | 2,484 | 310 | Phthalic Anhydride | 37 |
| 32c | 6b | 2,484 | 310 | Maleic Anhydride | 25 |
| 33c | 6b | 2,484 | 310 | Citraconic Anhydride | 28 |
| 34c | 6b | 2,484 | 310 | Succinic Anhydride | 25 |
| 35c | 6b | 2,484 | 310 | Diglycollic Acid | 35 |
| 36c | 6b | 2,484 | 310 | Aconitic Acid | 41 |
| 37c | 9b | 1,534 | 256 | Phthalic Anhydride | 49 |
| 38c | 9b | 1,534 | 256 | Maleic Anhydride | 33 |
| 39c | 9b | 1,534 | 256 | Citraconic Anhydride | 37 |
| 40c | 9b | 1,534 | 256 | Succinic Anhydride | 33 |
| 41c | 9b | 1,534 | 256 | Diglycollic Acid | 45 |
| 42c | 9b | 1,534 | 256 | Aconitic Acid | 58 |
| 43c | 10b | 1,834 | 306 | Phthalic Anhydride | 49 |
| 44c | 10b | 1,834 | 306 | Maleic Anhydride | 33 |
| 45c | 10b | 1,834 | 306 | Citraconic Anhydride | 37 |
| 46c | 10b | 1,834 | 306 | Succinic Anhydride | 33 |
| 47c | 10b | 1,834 | 306 | Diglycollic Acid | 45 |
| 48c | 10b | 1,834 | 306 | Aconitic Acid | 58 |
| 49c | 11b | 2,224 | 318 | Phthalic Anhydride | 42 |
| 50c | 11b | 2,224 | 318 | Maleic Anhydride | 28 |
| 51c | 11b | 2,224 | 318 | Citraconic Anhydride | 32 |
| 52c | 11b | 2,224 | 318 | Succinic Anhydride | 29 |
| 53c | 11b | 2,224 | 318 | Diglycollic Acid | 38 |
| 54c | 11b | 2,224 | 318 | Aconitic Acid | 50 |
| 55c | 12b | 2,289 | 327 | Phthalic Anhydride | 42 |
| 56c | 12b | 2,289 | 327 | Maleic Anhydride | 28 |
| 57c | 12b | 2,289 | 327 | Citraconic Anhydride | 32 |
| 58c | 12b | 2,289 | 327 | Succinic Anhydride | 29 |
| 59c | 12b | 2,289 | 327 | Diglycollic Acid | 38 |
| 60c | 12b | 2,289 | 327 | Aconitic Acid | 50 |

TABLE 4

| Example No. of Ester | Solvent | Amt. Solvent (grs.) | Esterification Temp., °C. | Time of Esterification (hrs.) | Water Out (cc.) |
|---|---|---|---|---|---|
| 1c | #7-3 | 238 | 145 | 1¼ | None. |
| 2c | #7-3 | 256 | 155 | 1¾ | Do. |
| 3c | #7-3 | 250 | 153 | 1½ | Do. |
| 4c | #7-3 | 265 | 153 | 1¾ | Do. |
| 5c | #7-3 | 258 | 150 | 4 | 7.1. |
| 6c | #7-3 | 270 | 158 | 3¼ | 8.2. |
| 7c | #7-3 | 230 | 140 | 1¼ | None. |
| 8c | #7-3 | 280 | 160 | 2 | Do. |
| 9c | #7-3 | 240 | 145 | 1¾ | Do. |
| 10c | #7-3 | 235 | 143 | 1 | Do. |
| 11c | #7-3 | 275 | 160 | 5¼ | 7.3. |
| 12c | #7-3 | 255 | 150 | 4¾ | 6.8. |
| 13c | #7-3 | 238 | 145 | 2 | None. |
| 14c | #7-3 | 260 | 150 | 2½ | Do. |
| 15c | #7-3 | 245 | 148 | 1½ | Do. |
| 16c | #7-3 | 270 | 158 | 3 | Do. |
| 17c | #7-3 | 258 | 150 | 4½ | 6.3. |
| 18c | #7-3 | 275 | 160 | 4 | 5.7. |
| 19c | #7-3 | 255 | 150 | 2½ | None. |
| 20c | #7-3 | 240 | 143 | 3¼ | Do. |
| 21c | #7-3 | 255 | 150 | 2 | Do. |
| 22c | #7-3 | 230 | 140 | 1¾ | Do. |
| 23c | #7-3 | 265 | 153 | 4¾ | 5.3. |
| 24c | #7-3 | 248 | 145 | 5¼ | 6.2 |
| 25c | #7-3 | 240 | 130 | 2½ | None. |
| 26c | #7-3 | 255 | 148 | 3 | Do. |
| 27c | #7-3 | 270 | 155 | 1½ | Do. |
| 28c | #7-3 | 235 | 140 | 1 | Do. |
| 29c | #7-3 | 260 | 150 | 5 | 4.0. |
| 30c | #7-3 | 245 | 148 | 4¾ | 4.4. |
| 31c | #7-3 | 275 | 158 | 1 | None. |
| 32c | #7-3 | 245 | 142 | 2½ | Do. |
| 33c | #7-3 | 260 | 150 | 1¾ | Do. |
| 34c | #7-3 | 270 | 155 | 3 | Do. |
| 35c | #7-3 | 280 | 160 | 4¾ | 4.7. |
| 36c | #7-3 | 255 | 156 | 3½ | 3.9. |
| 37c | #7-3 | 245 | 142 | 1 | None. |
| 38c | #7-3 | 275 | 158 | 1½ | Do. |
| 39c | #7-3 | 230 | 140 | 1¾ | Do. |
| 40c | #7-3 | 240 | 143 | 2½ | Do. |
| 41c | #7-3 | 245 | 150 | 5 | 5.4. |
| 42c | #7-3 | 275 | 158 | 4¾ | 6.4. |
| 43c | #7-3 | 260 | 150 | 1½ | None. |
| 44c | #7-3 | 250 | 145 | 1½ | Do. |
| 45c | #7-3 | 235 | 140 | 2¼ | Do. |
| 46c | #7-3 | 250 | 145 | 3 | Do. |
| 47c | #7-3 | 260 | 150 | 2 | 6.9. |
| 48c | #7-3 | 280 | 160 | 4½ | 7.1. |
| 49c | #7-3 | 265 | 150 | 1¾ | None. |
| 50c | #7-3 | 250 | 148 | 2¼ | Do. |
| 51c | #7-3 | 230 | 140 | 1¾ | Do. |
| 52c | #7-3 | 255 | 152 | 3 | Do. |
| 53c | #7-3 | 260 | 158 | 4¾ | 3.9. |
| 54c | #7-3 | 240 | 150 | 5¼ | 4.7. |
| 55c | #7-3 | 275 | 155 | 2½ | None. |
| 56c | #7-3 | 240 | 150 | 3 | Do. |
| 57c | #7-3 | 260 | 150 | 1¾ | Do. |
| 58c | #7-3 | 280 | 165 | 2 | Do. |
| 59c | #7-3 | 255 | 152 | 5 | 5.3. |
| 60c | #7-3 | 245 | 155 | 4¾ | 5.2. |

15

The procedure for manufacturing the esters has been illustrated by preceding examples. If for any reason reaction does not take place in a manner that is acceptable, attention should be directed to the following details: (a) Recheck the hydroxyl or acetyl value of the oxpropylated glycerol ether and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivatives results in an excess of the carboxylated reactant for the reason that apparently under conditions of reaction less reactive hydroxyl radicals are present then indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearances of the final products are much the same as the diols before esterification and in some instances were somewhat darker in color and had a reddish cast and perhaps somewhat more viscous.

16

PART 4

Diols such as polypropyleneglycol of approximately 2,000 molecular weight, for example, have been esterified with dicarboxy acids and employed as demusifying agents. On first examination the difference between the herein described products and such comparable products appears to be rather insignificant. In fact, the difference is such that it fails to explain the fact that compounds of the kind herein described may be, and frequently are, 10%, 15% or 20% better on a quantitative basis than the simpler compound previously described, and demulsify faster and give cleaner oil in many instances. The method of making such comparative tests has been described in a booklet entitled "Treating Oil Field Emulsions," used in the Vocational Training Course, Petroleum Industry Series, of the American Petroleum Institute.

The difference, of course, does not reside in carboxy acid but in the diol.

It is obvious that there is a distinct difference of structure between the initial diol subjected to reaction with polycarboxy acids and an ordinary polypropyleneglycol such as polypropylene glycol 2,000. In the case of the last mentioned compound the two hydroxyls are in the alpha-omega position to each other, i. e., attached to opposite position to each other, and there is no terminal branched radical such as

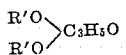

Stated another way, looking upon the ordinary glycol molecule as having two branches extended from a center or central part of the molecule in the present instance, i. e., the reactant herein employed as initial raw material, one has four hydroxyl branches of the molecule, i. e., the two hydroxyl radicals at one terminal and the branched radical as previously described at the other terminal. Furthermore, in the case of the instant diol instead of the hydroxyl radicals being in an alpha-omega position to each other they are terminally attached to two of the three terminally adjacent carbon atoms, being the terminal group opposite

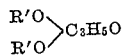

All of this has been pointed out previously in the formulas which illustrate the herein specified demulsifying agents.

PART 5

Previous reference has been made to other oxyalkylating agents other than propylene oxide, such as ethylene oxide. Obviously variants can be prepared which do not depart from what is said herein but do produce modifications. The diol derived by etherization of glycerol in the manner described can be prepared from glycerol diethers which have been reacted with ethylene oxide in modest amounts and then subjected to oxypropylation provided that the resultant derivative is (a) water-insoluble, (b) kerosene-soluble, and (c) has present 15 to 80 alkylene oxide radicals. Needless to say, in order to have water-insolubility and kerosene-solubility the large majority must be propylene oxide. Other variants suggest themselves as, for example, replacing propylene oxide by butylene oxide.

More specifically then one mole of such etherized glycerol of the kind described can be prepared from one mole of a glycerol diether which has been treated with 2, 4 or 6 moles of ethylene oxide and then treated with propylene oxide so as to produce a water-insoluble kerosene-soluble diol in which there are present 15 to 80 oxide radicals as previously specified. Similarly the propylene oxide can be added first and then the ethylene oxide, or random oxyalkylation can be employed using a mixture of the two oxides. The compounds so obtained are readily esterified in the same manner as described in Part 3, preceding. Incidentally, the diols described in Part 2 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quarternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

This application is a division of my copending application Serial No. 183,293, filed September 5, 1950.

Having thus described my invention, what I claim as new and desire to secure by Letters Patent, is:

1. Hydrophile synthetic products; said hydrophile synthetic products being characterized by the following formula:

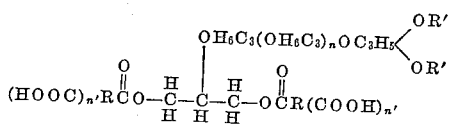

in which $n$ is a whole number varying from 15 to 80; $n'$ is a whole number not over 2; $R'$ is a hydrocarbon radical having less than 8 carbon atoms selected from the group consisting of alkyl radicals and the phenyl radical, and R is the radical of a polycarboxy acid selected from the group consisting of acyclic and isocyclic polycarboxy acids having not more than 8 carbon atoms and composed of carbon, hydrogen and oxygen of the formula:

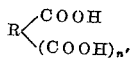

in which $n'$ has its previous significance; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group

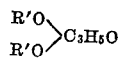

2. Hydrophile synthetic products; said hydrophile synthetic products being characterized by the following formula:

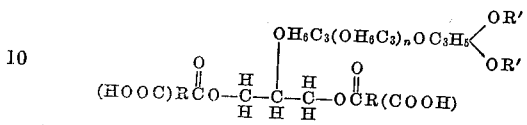

in which $n$ is a whole number varying from 15 to 80; $R'$ is a alkyl radical having less than 8 carbon atoms, and R is the radical of a dicarboxy acid selected from the group consisting of acyclic and isocyclic dicarboxy acids having not more than 8 carbon atoms and composed of carbon, hydrogen and oxygen of the formula:

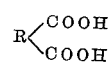

said dicarboxy acid having not more than 8 carbon atoms; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group

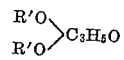

3. The product of claim 2 wherein $R'$ has at least 3 carbon atoms.

4. The product of claim 2 wherein $R'$ has at least 3 carbon atoms and is derived from a water-soluble alcohol.

5. The product of claim 2 wherein $R'$ has at least 3 carbon atoms, is derived from a water-soluble alcohol, and the dicarboxy acid is phthalic acid.

6. The product of claim 2 wherein $R'$ has at least 3 carbon atoms, is derived from a water-soluble alcohol, and the dicarboxy acid is maleic acid.

7. The product of claim 2 wherein $R'$ has at least 3 carbon atoms, is derived from a water-soluble alcohol, and the dicarboxy acid is succinic acid.

8. The product of claim 2 wherein $R'$ has at least 3 carbon atoms, is derived from a water-soluble alcohol, and the dicarboxy acid is citraconic acid.

9. The product of claim 2 wherein $R'$ has at least 3 carbon atoms, is derived from a water-soluble alcohol, and the dicarboxy acid is diglycollic acid.

References Cited in the file of this patent

UNITED STATES PATENTS

| Number | Name | Date |
|---|---|---|
| 2,357,933 | De Groote | Sept. 12, 1944 |
| 2,448,664 | Fife | Sept. 7, 1948 |
| 2,549,434 | De Groote | Apr. 17, 1951 |
| 2,554,667 | De Groote | May 29, 1951 |
| 2,562,878 | Blair | Aug. 7, 1951 |